Sept. 22, 1959 P. E. WIEGAND 2,905,416
CABLE RACK
Filed April 19, 1955 3 Sheets-Sheet 1
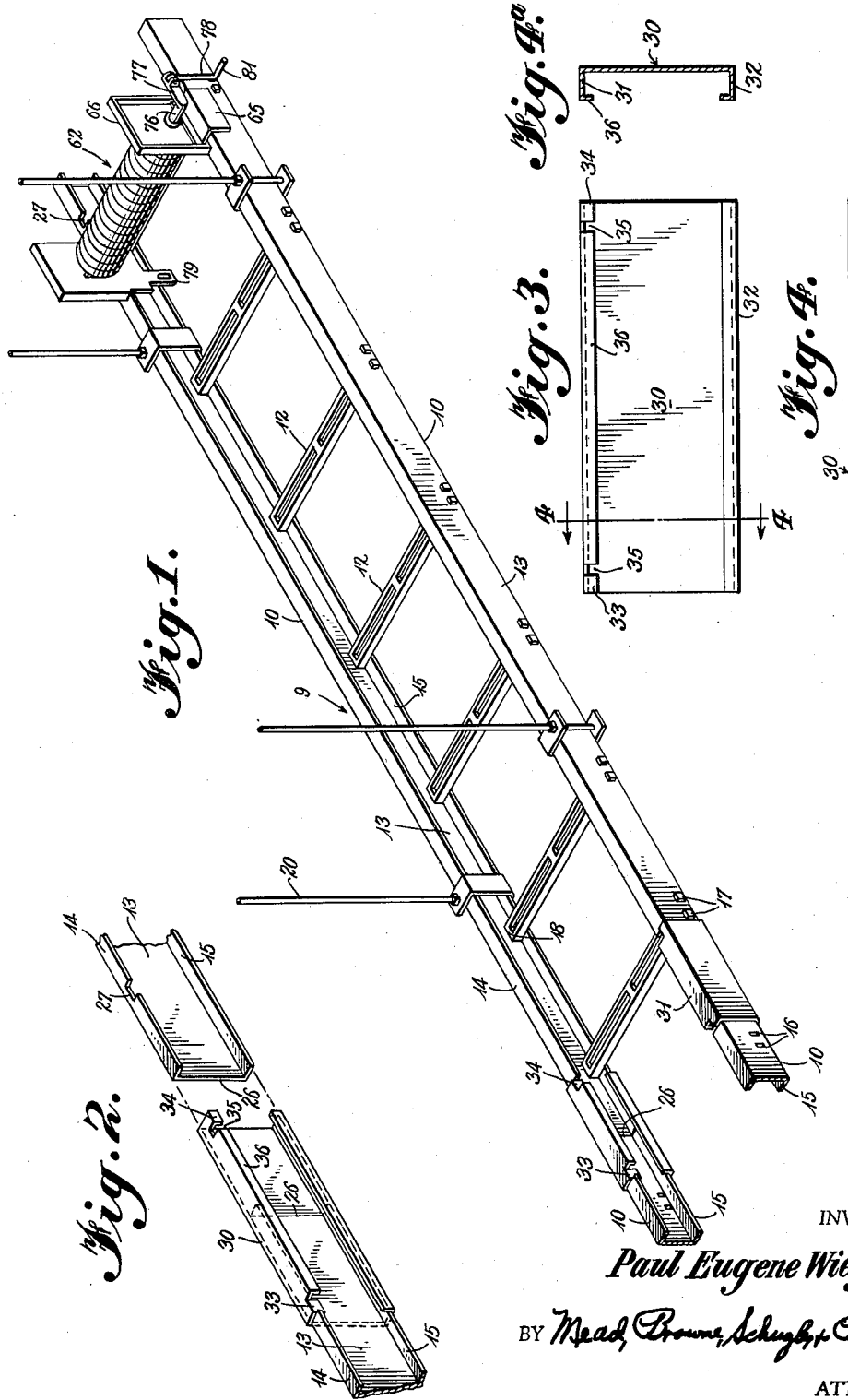
INVENTOR
*Paul Eugene Wiegand*
BY Mead, Browne, Schuyler & Beveridge
ATTORNEYS

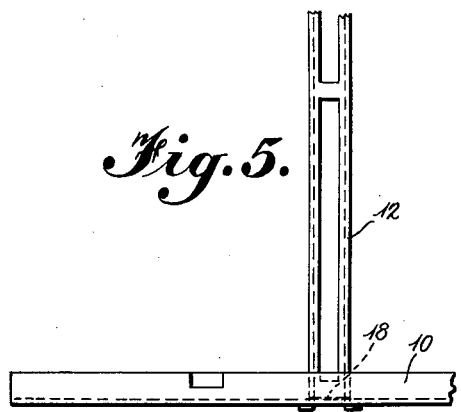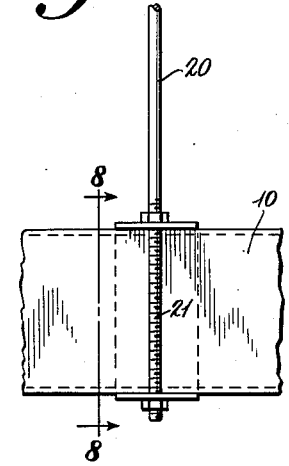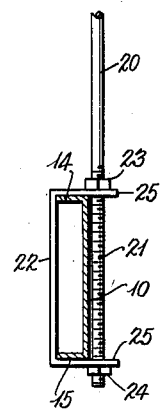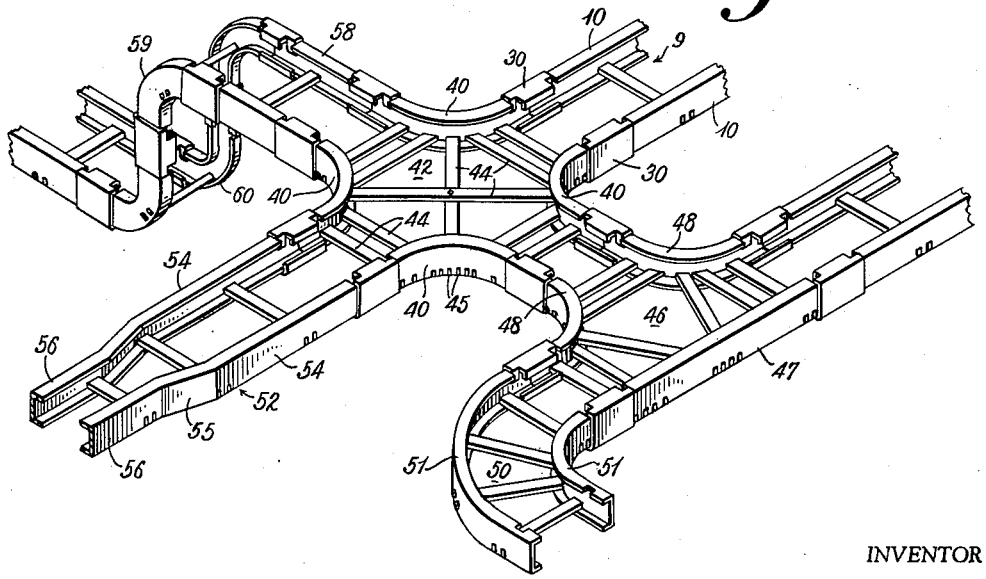

Sept. 22, 1959 P. E. WIEGAND 2,905,416
CABLE RACK
Filed April 19, 1955 3 Sheets-Sheet 3
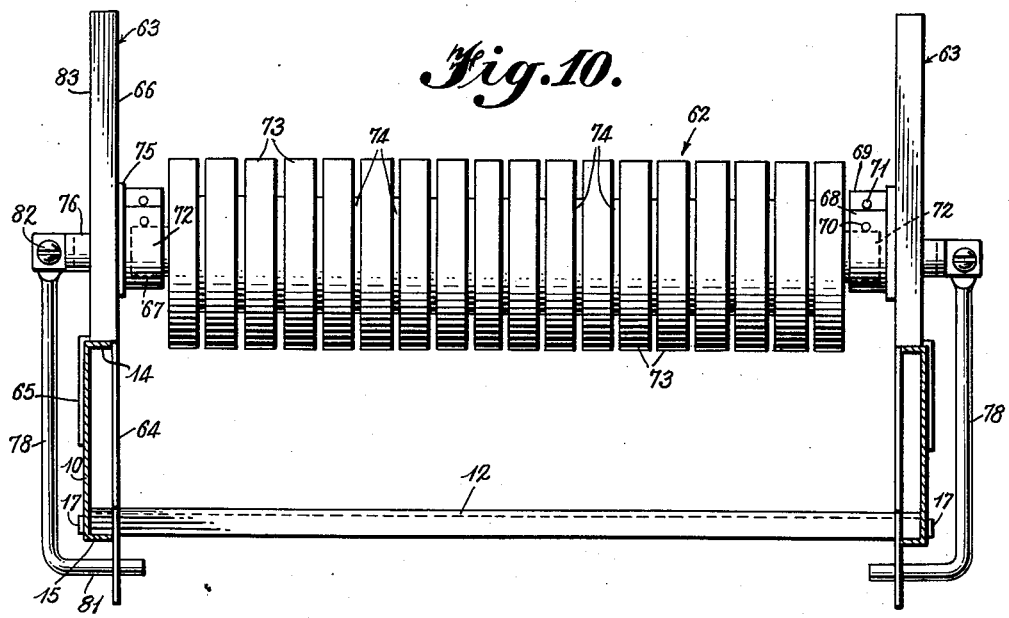
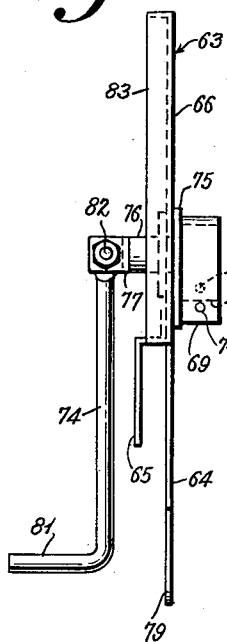
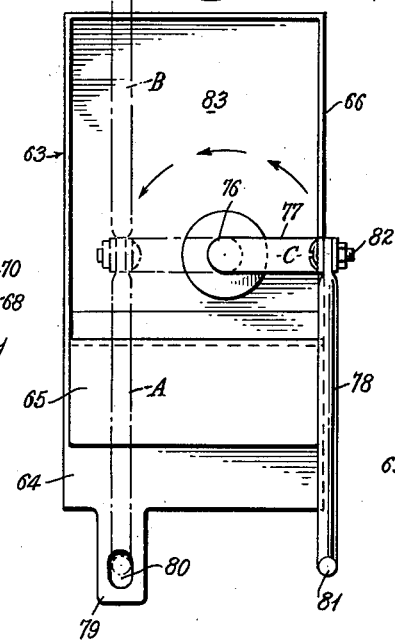
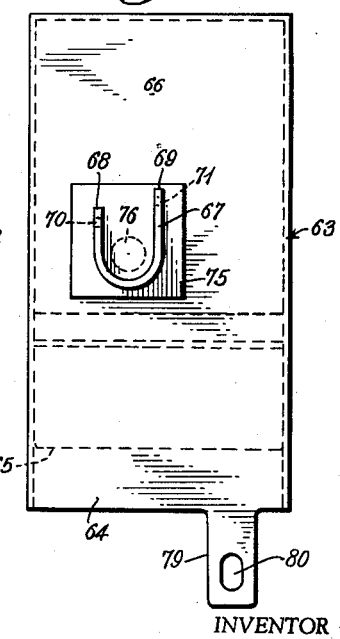
INVENTOR
*Paul Eugene Wiegand*
BY *Mead, Brown, Schuyler & Beveridge*
ATTORNEYS United States Patent Office 2,905,416
Patented Sept. 22, 1959

2,905,416

CABLE RACK

Paul Eugene Wiegand, Columbia Station, Ohio, assignor to The Chalfant Products Company, Inc., a corporation of Ohio Application April 19, 1955, Serial No. 502,392

3 Claims. (Cl. 248—58)

This invention relates to a cable rack and, more particularly, to a cable rack adapted to be suspended from above in large industrial plants.

Many serious problems have arisen in large industrial plants whenever it has been necessary to change the location of one or more large machines, or whenever a plant is re-tooled for a new line of products. As almost all of these machines are electrically operated, this has frequently resulted in the complete rewiring of the plant. Since it has been conventional practice to place a plurality of electrical cables into conduits which lie either on or beneath the floor and run throughout the length and width of the plant with outlets wherever necessary, it can readily be seen that the shifting of one or more machines will result in a respective shifting of these conduits. This procedure is costly in time, material handling and labor. If heavier equipment is to be used in the plant and it necessitates the use of larger cables in order to carry the greater current load, it would be necessary to remove some or all of the cables from the conduits and replace them with the new, heavier cables. Again this is a costly procedure.

It is the principal object of this invention to provide a cable rack which may be easily and quickly assembled, comprises a minimum of basic parts, may be suspended overhead from the ceiling, joists, beams and the like, and which may be rapidly dismantled whenever a shift in location is desired.

Another object of this invention is to provide a suspension type metallic cable rack adapted to support cables, pipes, conduits and the like and, in particular, to support interlocked armored cables whereby the supported cables are exposed to view and may be quickly and easily installed, removed or sections thereof replaced.

It is a further object of this invention to provide a cable rack for interlocking armor cables which consists of a minimum number of basic parts and which may be quickly and easily assembled to form a cable rack having straight sections, crosses, T's, L's, vertical bends and reduced widths, and capable of covering any given area.

Still another object of this invention is to provide a cable rack having a roller mechanism located thereon to facilitate the installing of cables on the rack, which mechanism can be quickly disassembled and removed from the rack while the cables are in supported position thereon.

In achieving the objects of this invention, one of the basic features lies in building the rack in sections and then joining the sections together in end-to-end relation to form any desired pattern.

Another feature resides in forming the rack in sections, each section consisting of stringers spaced from each other by a plurality of rungs having tab portions on each end thereof which are designed to fit into appropriate aligned openings in the stringers and adapted to be bent over to secure the rungs to the stringers.

Still another feature resides in placing the end portions of the stringer on one section in abutting relation to the end portions of the stringers of the next succeeding section and securing the sections together by means of splice plates which slidingly engage the stringer ends.

Other objects, features and advantages of this invention will become apparent from the following description taken in conjunction with the drawing wherein:

Fig. 1 is a perspective view of a straight section of the invention having a cable roller located at one end thereof.

Fig. 2 is a perspective view of the splice plate of the invention shown in locking relation to one of a pair of fragmentary adjacent stringer end portions.

Fig. 3 is an enlarged side elevation of the splice plate of this invention.

Fig. 4 is a plan view of the splice plate shown in Fig. 3.

Fig. 4a is a sectional view of the splice plate taken along lines 4—4 of Fig. 3.

Fig. 5 is a fragmentary top view of the invention showing details of a locking feature of the invention.

Fig. 6 is a fragmentary side view of the structure shown in Fig. 5.

Fig. 7 is a fragmentary side view of an embodiment of the suspending means used in this invention.

Fig. 8 is a sectional view of the suspending means taken along lines 8—8 of Fig. 7.

Fig. 9 is a perspective view of a partial assembly of the invention disclosing various forms and shapes which may be utilized in the construction thereof.

Fig. 10 is a front elevational view of the cable roller attached to the cable rack.

Fig. 11 is a side elevational view of one of the side plates of the cable roller.

Fig. 12 is a front elevational view of the side plate of the cable roller.

Fig. 13 is a rear view of the side plate of the cable roller.

As best seen in Fig. 1 of the drawings, a cable rack section 9 is formed by fastening a pair of stringers 10 to a plurality of rungs 12. In the preferred embodiment of the invention, the stringers 10 are bars or rails which are channel-shaped in cross-section and include a side portion 13, an upper flange 14 and a lower flange 15, which flanges are substantially perpendicular to the side portion 13. Spaced at predetermined distances near the lower edge of the side portions 13 of stringers 10 are a plurality of pairs of openings 16 adapted to receive the tab portions 17 extending laterally from each end portion 18 of the rungs 12. By inserting the tabs 17 through the perforations 16 and then bending the tabs so as to have them lie adjacent the side portion 13 of the stringers 10, the rungs become securely fastened to the stringers and a cable rack section 9 is formed.

Although there are a number of means by which the cable rack of this invention may be suspended within an industrial plant so as to be above the machinery and equipment to be supplied with electrical power, the preferred means, and what may be the simplest means to perform this task, are a plurality of rods 20 disposed at appropriate places along the ceiling, beams, joists and the like of the plant and depending downwardly as shown in Fig. 1. The lower portions of the rods 20 are threaded as shown at 21 (Fig. 7). A channel clamp 22 of a size to snugly fit over the upper and lower flanges 14, 15 of the stringer 10 is threaded onto the lower portion 21 of the rod 20 and its position on the rod is determined by the position of the bolt 23 thereon. The channel clamp 22 is secured in place by means of bolt 24 after the lower portion of rod 20 is passed through the openings in the arms 25 of the clamp 22.

When a cable rack section has been assembled in the manner illustrated in Fig. 1, a second assembled cable rack section is placed adjacent the first in such a manner that the end portions 26 of the two pairs of stringers 10 are in abutting relation. A notch 27 is provided on the upper flange 14 of each stringer, the purpose of which will be explained shortly.

In order to join together and securely hold the two abutting end portions of the stringers of each cable rack section, a splice plate 30 having the channel-shaped configuration illustrated in Fig. 4a is utilized. The distance between the inner surfaces of flanges 31 and 32 of splicer plate 30 is substantially equal to the height of the stringer 10 measured between the external surfaces of upper flange 14 and lower flange 15. Thus, the splice plate 30 is adapted to fit over and slidingly engage the end portions 26 of the stringers 10. The upper flange 31 of the splicer plate 30 is slotted at a point just short of each end thereof so as to form fingers 33 and 34 thereon. Slots 35 extend the entire width of the lip 26 and approximately one-half the width of the upper flange 31 of the splice plate 30. The depth of each slot 35 may correspond to the depth of the notch 27 on the stringer 10. After the splicer plate 30 has been placed over one end portion 26 of the stringer as shown in Fig. 2, the finger 33 is bent downwardly and inwardly into notch 27 until it grips the undersurface of flange 14. This securely locks one side of the splice plate to the stringer. The remaining side of the splice plate is then fitted over the end portion of the adjoining stringer until the end portions 26 of both stringers are in abutting relation within the channels of the plate. Finger 34 will then be located directly above slot 27 so that when the finger 34 is bent downwardly and inwardly it locks that portion of the splice plate to the stringer. Thus the two stringer sections are securely clamped together. By attaching each cable rack section to each adjacent cable rack section by means of splice plates 30, it can readily be seen that a cable rack of any desired length can be quickly and easily assembled.

While thus far there has been described the assembly of a straight cable rack, it will be desirable and, in fact, almost necessary that the rack have additional sections of particular configuration, such as crosses, L's, T's, and the like. This will enable the rack to support lengths of interlocked armor cable around corners, to carry them upwardly or downwardly as required, to widen or to narrow the width of the rack when necessary in order to avoid obstructions which may be in its path, and to insure the installation of cables in any one of several directions. Several embodiments of the invention are illustrated in Fig. 9 to show how a cable rack may be assembled to meet the needs of an industrial plant. It is to be noted that each of the various sections are formed by rungs fastened to stringers and each pair of stringer ends are secured to the abutting stringer ends of adjoining sections by splice plates. Straight rack section 9 (Fig. 9) has its stringer end portions secured by means of splice plates 30 to the curved stringers 40 of the cross rack designated generally at 42. The opposite ends of rungs 44 of the cross rack 42 have laterally extending tabs 45 which are inserted into appropriate openings in the curved stringers and bent over so as to lie adjacent the surfaces of the stringers. Secured to one end of cross rack section 42 is T rack section 46 comprising a straight stringer 47 and a pair of curved stringers 48. One end of the T rack section 46 is shown attached to the stringers 51 of curved rack section 50. Another end of the cross rack section 42 is attached to a reducer rack 52 having a pair of spaced stringers 54 which are bent inwardly a short distance at 55 before continuing as a pair of stringers 56 which are more closely spaced together. The remaining end of the cross rack section 42 is attached to a short straight section 58 which, in turn, is connected to a stepdown rack section 59 comprising a pair of S-shaped stringers 60.

In order to facilitate the installing of interlocked armor cables upon a suspended assembled cable rack which may extend in various directions for great distances throughout an industrial plant, the rack is provided with one or more cable rollers 62 (Fig. 1) which are easily assembled for use with the cable rack and then quickly disassembled while the cable remains supported thereon. The details of a preferred embodiment of this cable roller are best seen in Figs. 10–13, inclusive.

The cable roller, designated generally at 62, consists of a pair of oppositely disposed side plates or stanchions 63 adapted to be seated at their lower ends upon upper flange 14 of stringer 10. As the structure of both side plates is similar and the inner surfaces thereof are mirror images of each other, only one side plate will be described here. The lower end of side plate 63 is saddle-shaped with each leg 64, 65 of the saddle extending downwardly to snugly engage one side of the cable rack stringer 10. Rotatably attached to the inner surface 66 of side plate 63 and slightly off center thereon is a base plate 75 having mounted thereon a U-shaped ring 67 having legs 68, 69 of different lengths. Each of the legs 68, 69 of the ring 67 has openings 70, 71, respectively, therethrough adapted to receive a cotter pin, wire, or the like so as to lock the shaft 72 on the rings 67 and prevent its accidental removal therefrom. Shaft 72, which is disposed between side plates 63 and rests upon the U-shaped rings 67, has a plurality of rollers 73, preferably made of plywood, disposed along substantially its entire length with each roller being spaced from adjacent rollers by washers 74.

As illustrated in Fig. 10 of the drawing, the cable roller, when seated upon the stringers 10 of the cable rack frame, is in position for assisting in the installing of the interlocked armor cable onto the previously assembled cable rack. As the cable (not shown) slides across the top surfaces of the rungs 12 of the rack, it encounters a certain amount of friction, which amount progressively increases as the length of the cable rack increases. At designated intervals along the cable rack are placed cable rollers 62 which enable the interlocked armor cables to be supported on and dragged over the rollers 73 which rotate effortlessly about shaft 72. It is to be noted that after several cables have been placed upon the cable rack and cable roller, and are extended to the various designated areas within the industrial plant, the cables are still resting upon the cable rollers and it becomes neecssary to remove the rollers without having to lift the cables or move them in any manner whatever. This may be simply and easily accomplished with the particular roller embodied in the drawing, Fig. 10. Base plate 75 and U-shaped ring 67 are rotatably secured by means of dowel 76 to one end of arm 77 disposed at substantially a right angle to the radial axis of the dowel 76. The other end of arm 77 is pivotably attached to one end of handle 78 and the opposite end of handle 78 is bent at right angles thereto to form an L.

Depending downwardly from the lower edge of leg 64 of side plate 63 is an ear member 79 having an opening 80 therethrough, which opening is adapted to receive the lower portion 81 of handle 78 when the cable roller is in locked position. To prevent the rotation of the U-shaped rings 67 and their bases 75 when cables are dragged over the rollers 73, the handle 78 is pivoted downwardly about bolt 82 until the lower leg 81 of the handle is substantially perpendicular to a plane including the side plate 63 and lower edge 64 and passes through opening 80 in ear 79. This effectively locks the U-rings 67 in place since they cannot rotate without the rotation of handle 78 and arm 77.

After the cable has been laid and it is desired to remove the roller from the cable rack, handle 78 is pivoted about bolt 82 in a direction away from the ear 79 so that the lower leg 81 of handle 78 is removed from the opening 80. As may best be seen in Fig. 12 of the drawing, the handle 78 is pivoted from its locking position shown in dotted lines at the lower left hand portion of side plate 63 designated A and the pivoting continues through an arc of 180° until the handle is in the position designated B. In this position, the lower leg 81 of the handle 78 is now pointing away from the external surface 83 of side plates 63. After the handle has been pivoted to position B the arm 77 is rotated through an arc of 180° to the position indicated in solid lines in Fig. 12 and designated C. The rotating of arm 77 results in a corresponding rotation of U-shaped ring 67 through an arc of 180° until the open end of the ring 67 is facing downwardly toward the cable rack. As soon as this 180° rotation of the arm 77 has occurred, and the handle and U-shaped ring are in the position shown in Fig. 11, the shaft 72 falls by gravity from the U-shaped ring and through the space between the stringers 10. This causes the cables located and supported on the plywood rollers 73 to drop slightly until their fall is arrested by the rungs 12 of the rack 9. Side plates 63 are then lifted upwardly out of engagement with stringers 10 and the roller may be set up in another location. While the shaft 72 and rollers 73 may be removed from the rings 67 by the rotation of both handles 78 on the side plates 63, it is also possible in most instances to have the shaft 72 drop out of the device by the rotation of only one handle 78, provided the shaft end opposite the pivoted handle has sufficient clearance to drop out of ring 67.

It is to be understood that various changes, modifications and departures from the specific disclosure may be made by those skilled in the art within the scope and spirit of the invention as defined in the appended claims.

Having fully described the invention, what is claimed is:

1. A rack adapted for suspension in a horizontal position for supporting a plurality of horizontally extending cables thereon, said rack comprising a plurality of units, each of said units consisting of a pair of parallel, oppositely spaced stringers, each of said stringers provided with an upper and lower laterally extending flange, each of said stringers having a plurality of pairs of spaced openings, said openings on one stringer being aligned with said corresponding openings on the opposite stringer, a plurality of rungs disposed between said stringers, each of said rungs including a slotted surface and a pair of integral flanges depending downwardly from said surface, said flanges on each rung extending beyond the ends of said slotted surface to form tabs passing through said respective pairs of openings in said stringers and bent over to secure said rungs to said stringers, each of said units joined to each other by the pair of stringers of each unit being placed in end-to-end abutting relation with the pair of stringers of another unit and means including a splice plate securing each of said abutting ends together.

2. The rack as defined in claim 1 wherein each of said pairs of openings on said stringers is adjacent the lower flanges of said stringers and the outer ends of the downwardly depending flanges on each of said rungs is in contact with and supported by the lower flange of its respective stringer when said tabs are passed through said openings and bent over to lock said rungs to said stringers.

3. The rack as defined in claim 1 wherein each stringer has a notch on its upper flange located substantially adjacent the abutting end of said stringer, and said means includes a splice plate having an upper and lower flange projecting laterally therefrom, said splice plate slidingly engaging and bridging the outer surfaces of the abutting ends of said stringers, said splice plate having fingers formed on its upper flange, said fingers bent downwardly and inwardly into said notches on said upper flanges of said stringers to engage the undersurfaces of said stringer flanges and lock the abutting end portions of said stringers together.

References Cited in the file of this patent

UNITED STATES PATENTS

| | | |
|---|---|---|
| 379,688 | Dennis | Mar. 20, 1888 |
| 1,406,228 | Riedel | Feb. 14, 1922 |
| 1,932,074 | Johnson | Oct. 24, 1933 |
| 1,970,422 | Foster | Aug. 14, 1934 |
| 2,318,859 | Hugulet | May 11, 1943 |
| 2,391,272 | Rose | Dec. 13, 1945 |
| 2,535,427 | Kindorf | Dec. 26, 1950 |
| 2,646,818 | Bimpson | July 28, 1953 |
| 2,656,998 | Ullberg | Oct. 27, 1953 |
| 2,659,999 | Ullberg | Oct. 27, 1953 |
| 2,696,283 | Barry | Dec. 7, 1954 |